3,300,691
ELECTROLYTIC CAPACITOR WITH A GELLED ELECTROLYTE OF AN IONOGEN AND DIMETHYLFORMAMIDE
Curtiss M. Gilbert, North Adams, Mass., assignor to Sprague Electric Company, North Adams, Mass., a corporation of Massachusetts
Filed Feb. 18, 1964, Ser. No. 345,766
3 Claims. (Cl. 317—230)

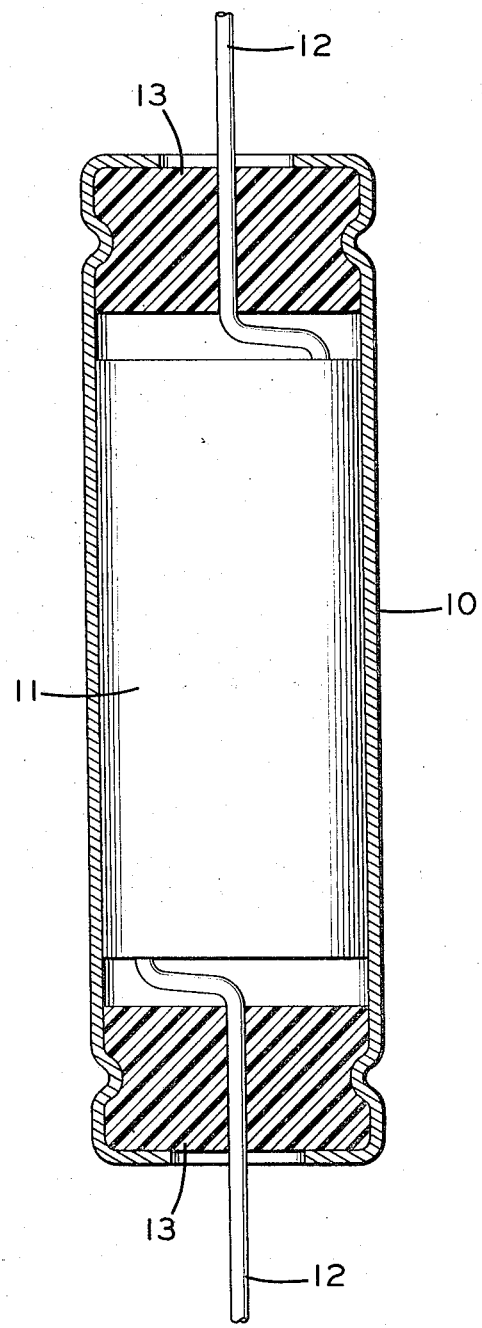

The present invention is concerned with an electrolytic capacitor and process for forming the same.

In the manufacture of electrolytic capacitors the liquid electrolyte presents problems of handling and sealing. The electrolyte must be capable of being easily dispensed into the capacitor containers and then kept within the containers by effective sealing means. Once sealed within the unit, conventional electrolytes are mobile enough to flow freely and creep to the sealing means. This permits corrosion and leakage in all but the most expensive sealing arrangements.

An approach to a solution of this problem has been the use of a gelling agent, e.g. silica, in the electrolyte, e.g. sulfuric acid. This tack presents problems which can confound the above-mentioned disadvantages of a liquid electrolyte. For example, the gelling agent is generally added to the electrolyte prior to its inclusion in the unit and it is considerably more difficult to handle a gelled electrolyte than one in liquid form. The gelling of an electrolyte, more often than not, adversely affects the electrical characteristics of the electrolyte so as to negate any other advantage. Furthermore, some gels are reversible or thixotropic and thus their efficacy is only temporary.

It is an object of the present invention to present an electrolytic capacitor not subject to the foregoing disadvantages.

Another object of the invention is a process for forming this capacitor.

Other objects and many of the attendant advantages of this invention will be readily appreciated as the same become better understood by reference to the following detailed description when considered in connection with the accompanying drawing, wherein:

The sole figure of the drawing is a side view, in section, of a tantalum capacitor within the scope of the present invention.

In accordance with the present invention it has been found that a capacitor containing an electrolyte comprising an ionogen and dimethylformamide, gelled with a hydroxypropyl methylcellulose exhibits none of the prior art disadvantages.

Referring to the drawing, the figure shows a capacitor comprising a metal case 10 in which is positioned a tantalum foil capacitance section 11 having tantalum lead-wires 12. The case is sealed by Teflon gaskets 13. The capacitance section 11 is impregnated with the gelled electrolyte of the present invention.

The gelling agent employed in the capacitors of the present invention is a particular hydroxypropyl methylcellulose having a methoxyl degree of substitution of 1.08 to 1.42, and a hydroxypropyl degree of substitution of 0.1 to 0.3. This particular cellulose is insoluble in dimethylformamide at room temperature. This characteristic permits the electrolyte to remain fluid until gelled by a heat treatment, as shown in the following example.

EXAMPLE

Approximately 3% by weight of hydroxypropyl methylcellulose having a methoxyl degree of substitution of 1.08 to 1.42, and a hydroxypropyl degree of substitution of 0.1 to 0.3 was dispersed at room temperature in dimethylformamide containing 10% $NH_4NO_3$. After addition of the cellulose the electrolyte had a slightly higher viscosity but was still a comparatively mobile liquid. The mixture was then heated to slightly above 90° C. for approximately 1 hour. A firm gel resulted. The gel proved to be stable to repeated heating and cooling cycles and showed no signs of thixotropy.

The gelled electrolyte maintained approximately the same electrical characteristics as the non-gelled electrolyte over the temperature range of —55° C. to 125° C.

| | Temperature | | |
|---|---|---|---|
| | —55° C. | 25° C. | 125° C. |
| Gelled, ohm cm | 500 | 78 | 42 |
| Non-gelled, ohm cm | 470 | 76 | 39 |

This example demonstrates that the subject gelling agent will not gel the electrolyte at room temperature. The dispersion must be heated to above 90° C. before gellation is effected. This permits easy impregnation of a capacitor section with liquid electrolyte, which can thereafter be gelled at any subsequent point in the manufacturing process by a heat treatment. This will keep the electrolyte in association with the anode and cathode and away from the end-seal.

By way of comparison a hydroxypropyl methylcellulose with a methoxyl degree of substitution of 1.68 to 1.82 and a hydroxypropyl degree of substitution of 0.17 to 0.3 failed to gel the same dimethylformamide electrolyte either at room temperature or upon heating to 90° C. and above. Likewise, two commercial guar gums would not produce a gel. Guar gum consists of ground endosperm of guar seeds. A commercial silica gelled the electrolyte at room temperature and was unstable at 125° C.

The gelling agent of the present invention will gel not only electrolytes wherein all of the solvent is dimethylformamide but also dimethylformamide containing a significant proportion of water or water and ethylene glycol. For example, a 4 to 1 solution of dimethylformamide and water containing an electrolyte solute is effectively gelled with approximately 5% of the hydroxypropyl methylcellulose of the present invention. A 1:1:1 solution of dimethylformamide, water and ethylene glycol containing an electrolyte solute is also gelled with the cellulose of the instant invention.

The heating time necessary to produce the gelled electrolyte of the present invention is not critical and may vary depending upon the exact constitution of the electrolyte. The electrolyte should be heated for a time sufficient to gel the electrolyte. Normally, this will occur within a period of from 2 to 90 minutes. The preferred temperature falls somewhere between 90° C.–125° C. There is little practical advantage in heating above 125° C.

The exact proportion of the cellulose gelling agent likewise is not critical. The amount will vary depending upon the exact constitution of the electrolyte. In general an amount sufficient to gel the electrolyte is employed.

The gelled electrolyte of the present invention can be employed not only with convolutely wound foil capacitance sections, but with porous anode, etched wire anode and non-etched wire anode capacitors.

As used herein the term "ionogen" refers to any of the pior art electrolyte solutes, e.g. ammonium nitrate, ammonium pentaborate, etc.

As is evident from the foregoing the invention is not to be limited to the rather specific illustrative device or the process of making this device. Modifications and variations, as well as the substitution of equivalents may be made without departing from the spirit of the invention as defined in the appended claims.

What is claimed is:

1. An electrolytic capacitor comprising an anode and a cathode in contact with a gelled electrolyte comprising an ionogen and dimethylformamide gelled with a hydroxypropyl methylcellulose having a methoxyl substitution of from 1.08 to 1.42 and a hydroxypropyl substitution of from 0.1 to 0.3.

2. An electrolytic capacitor comprising a tantalum foil capacitance section positioned within a metal case, said section being impregnated with a gelled electrolyte consisting essentially of about 3% by weight of hydroxypropyl methylcellulose having a methoxyl degree of substitution of from 1.08–1.42, and a hydroxypropyl degree of substitution of from 0.1–0.3 in dimethylformamide containing about 10% $NH_4NO_3$.

3. A process for forming an electrolytic capacitor comprising assembling an anode and a cathode with a liquid electrolyte comprising an ionogen, dimethylformamide and a gelling proportion of a hydroxypropyl methylcellulose, wherein said cellulose has a methoxyl substitution of from 1.08 to 1.42 and a hydroxypropyl substitution of from 0.1 to 0.3, and subjecting said electrolyte to a temperature in excess of 90° C. for a period of time sufficient to gel said electrolyte.

No references cited.

JOHN W. HUCKERT, *Primary Examiner.*

J. D. KALLAM, *Assistant Examiner.*